(12) United States Patent
An et al.

(10) Patent No.: US 9,008,111 B2
(45) Date of Patent: Apr. 14, 2015

(54) METHOD AND APPARATUS FOR COLLISION AVOIDANCE IN SENSOR NETWORK

(75) Inventors: Sun-Shin An, Seoul (KR); Sea Young Ahn, Gyeonggi-do (KR)

(73) Assignee: Korea University Research and Business Foundation, Seoul (KR)

(*) Notice: Subject to any disclaimer, the term of this patent is extended or adjusted under 35 U.S.C. 154(b) by 341 days.

(21) Appl. No.: 13/414,978

(22) Filed: Mar. 8, 2012

(65) Prior Publication Data

US 2012/0230205 A1 Sep. 13, 2012

(30) Foreign Application Priority Data

Mar. 11, 2011 (KR) .................. 10-2011-0021841

(51) Int. Cl.
*H04W 52/02* (2009.01)
*H04W 28/04* (2009.01)
*H04W 84/18* (2009.01)
*H04W 4/00* (2009.01)

(52) U.S. Cl.
CPC ........ *H04W 28/044* (2013.01); *H04W 52/0225* (2013.01); *H04W 28/04* (2013.01); *H04W 52/0216* (2013.01); *H04W 52/0219* (2013.01); *H04W 84/18* (2013.01); *H04W 4/006* (2013.01)

(58) Field of Classification Search
None
See application file for complete search history.

(56) References Cited

U.S. PATENT DOCUMENTS

| | | | | |
|---|---|---|---|---|
| 7,403,539 | B1* | 7/2008 | Tang et al. | 370/445 |
| 7,672,652 | B2* | 3/2010 | Choi et al. | 455/171.1 |
| 7,680,150 | B2* | 3/2010 | Liu et al. | 370/469 |
| 8,031,744 | B2* | 10/2011 | Radunovic et al. | 370/486 |
| 2004/0174847 | A1* | 9/2004 | Menon et al. | 370/328 |
| 2004/0240426 | A1* | 12/2004 | Wu et al. | 370/350 |
| 2008/0003946 | A1* | 1/2008 | Lee et al. | 455/41.2 |
| 2008/0144493 | A1* | 6/2008 | Yeh | 370/230 |
| 2008/0170544 | A1* | 7/2008 | Tang et al. | 370/329 |
| 2012/0106352 | A1* | 5/2012 | Peruzzi et al. | 370/241 |

* cited by examiner

*Primary Examiner* — Ayaz Sheikh
*Assistant Examiner* — Tarell Hampton
(74) *Attorney, Agent, or Firm* — Alston & Bird LLP

(57) ABSTRACT

Disclosed is a method and apparatus for collision avoidance in a sensor network. The method includes transmitting data by a transmitter; comparing, by the transmitter, a remaining time between the data transmission and a backoff period with a turnaround time taken for the transmitter to switch from a transmit (Tx) mode to a receive (Rx) mode; selectively transmitting, by the transmitter, a busy signal indicating that a channel is in use, according to the comparison result; and receiving, by the transmitter, an acknowledgement (ACK) signal from a receiver after the turnaround time has elapsed.

16 Claims, 9 Drawing Sheets

METHOD AND APPARATUS FOR COLLISION AVOIDANCE IN SENSOR NETWORK

CROSS-REFERENCE TO RELATED APPLICATIONS

This application claims priority under 35 U.S.C. §119 to Korean Patent Application No. 10-2011-0021841 filed on Mar. 11, 2011, in the Korean Intellectual Property Office, the disclosure of which is incorporated herein by reference in its entirety.

BACKGROUND

1. Field

The present invention relates to a method and apparatus for collision avoidance in a sensor network, and more particularly to a method and apparatus for collision avoidance when nodes use communication channels to exchange data therebetween in a sensor network based on a slotted IEEE 802.15.4 standard, and a recording medium recording the method.

2. Description of the Related Art

A sensor network, which is one of core technologies for a ubiquitous communication system, has been used in a variety of industrial and customer applications, such as distribution automation, security, industrial process automation and control, smart home and U-health care. The sensor network typically employs IEEE 802.15.4 which is a standard that specifies the physical layer and the link layer for low-rate wireless personal area networks (LR-WPANs). It is the basis for the ZigBee which has been employed in a variety of applications.

The sensor network is built of sensor nodes. The sensor node has to be as low in power consumption and manufacturing cost as possible. Low energy consumption is one major challenge in the sensor network. Distribution of sensor nodes equipped with mechanism to reduce energy consumption in the sensor network will help increase the lifetime of the sensor network. Such mechanism to reduce energy consumption may be applied to any type of ubiquitous communication system as well as the sensor network.

SUMMARY

The present invention relates to a method and apparatus for collision avoidance in a sensor network, which is capable of preventing sensor nodes from performing unnecessary clear channel assessment to check if a communication channel is busy since it takes time for communication hardware of sensor nodes in the sensor network to switch from transmit (Tx) mode to receive (Rx) mode, capable of avoiding modification of hardware to transmit a message indicating that a channel is in use, and capable of saving energy for use in operation of the sensor network and data transmission/reception.

According to one general aspect, there is provided a method for collision avoidance in a sensor network in compliance with a predetermined standard, the method including transmitting data by a transmitter; comparing, by the transmitter, a remaining time between the data transmission and a backoff period with a turnaround time taken for the transmitter to switch from a transmit (Tx) mode to a receive (Rx) mode; selectively transmitting, by the transmitter, a busy signal indicating that a channel is in use, according to the comparison result; and receiving, by the transmitter, an acknowledgement (ACK) signal from a receiver after the turnaround time has elapsed.

The selectively transmitting of a busy signal may include transmitting, by the transmitter, the busy signal if the remaining time is less than the turnaround time.

The selectively transmitting of a busy signal may further include checking, by the transmitter, channel information thereof using a failure counter indicating a frequency of clear channel assessment (CCA) failure and a congestion control counter indicating whether or not a channel is busy. Further, if the remaining time is less than the turnaround time and the congestion control counter is enabled, the transmitter may transmit the busy signal.

According to another general aspect, there is provided a method for collision avoidance in a sensor network in compliance with a predetermined standard, the method including performing clear channel assessment (CCA) by a node rather than a transmitter or a receiver; checking whether or not the node has received a busy signal from the transmitter; and selectively transmitting, by the node, data to the transmitter after the turnaround time has elapsed according to the CCA result and the checking result.

The busy signal may be generated and transmitted by the transmitter if a remaining time between data transmission of the transmitter and a backoff period is compared with a turnaround time taken to switch from a transmit (Tx) mode to a receive (Rx) mode and the remaining time is less than the turnaround time. The selectively transmitting of data may include transmitting data from the node to the transmitter only if the channel is in idle state and the busy signal is not received.

According to another aspect, there is provided a computer-readable recording medium having embodied therein instructions, which, when executed in a computer system, cause the computer system to perform the method for collision avoidance in a sensor network.

According to yet another aspect, there is provided an apparatus for collision avoidance in a sensor network in compliance with a predetermined standard, the apparatus including a communication unit configured to transmit and receive data in transmit (Tx) mode and receive (Rx) mode, respectively; and a control unit configured to compare a remaining time between the data transmission in the transmit mode and a backoff period with a turnaround time taken to switch from the transmit mode to the receive mode, and configured to wait for the remaining time using a delay function. Further, the communication unit may selectively transmit in the transmit mode a busy signal indicating that a channel is in use according to the comparison result of the control unit, and may be switched to the receive mode after the turnaround time has elapsed to receive an acknowledgement signal from a receiver receiving the data.

The communication unit may transmit the busy signal if the remaining time is less than the turnaround time. The communication unit may check channel information thereof using a failure counter indicating a frequency of clear channel assessment (CCA) failure and a congestion control counter indicating whether or not a channel is busy. The communication unit may transmit the busy signal if the remaining time is less than the turnaround time and the congestion control counter is enabled.

Other features will become apparent to those skilled in the art from the following detailed description, which, taken in conjunction with the attached drawings, discloses exemplary embodiments of the invention.

DETAILED DESCRIPTION

Prior to describing exemplary embodiments of the present invention, environments for implementing the exemplary embodiments of the present invention will be briefly introduced and basic ideas for the exemplary embodiments will also be presented. While technologies for implementing IEEE 802.15.4 slotted CSMA/CA (Carrier Sense Multiple Access with Collision Avoidance) are presented, the exemplary embodiments of the present invention may be applied to any method and apparatus for collision avoidance in a sensor network within the scope of the technologies.

Figure 1:
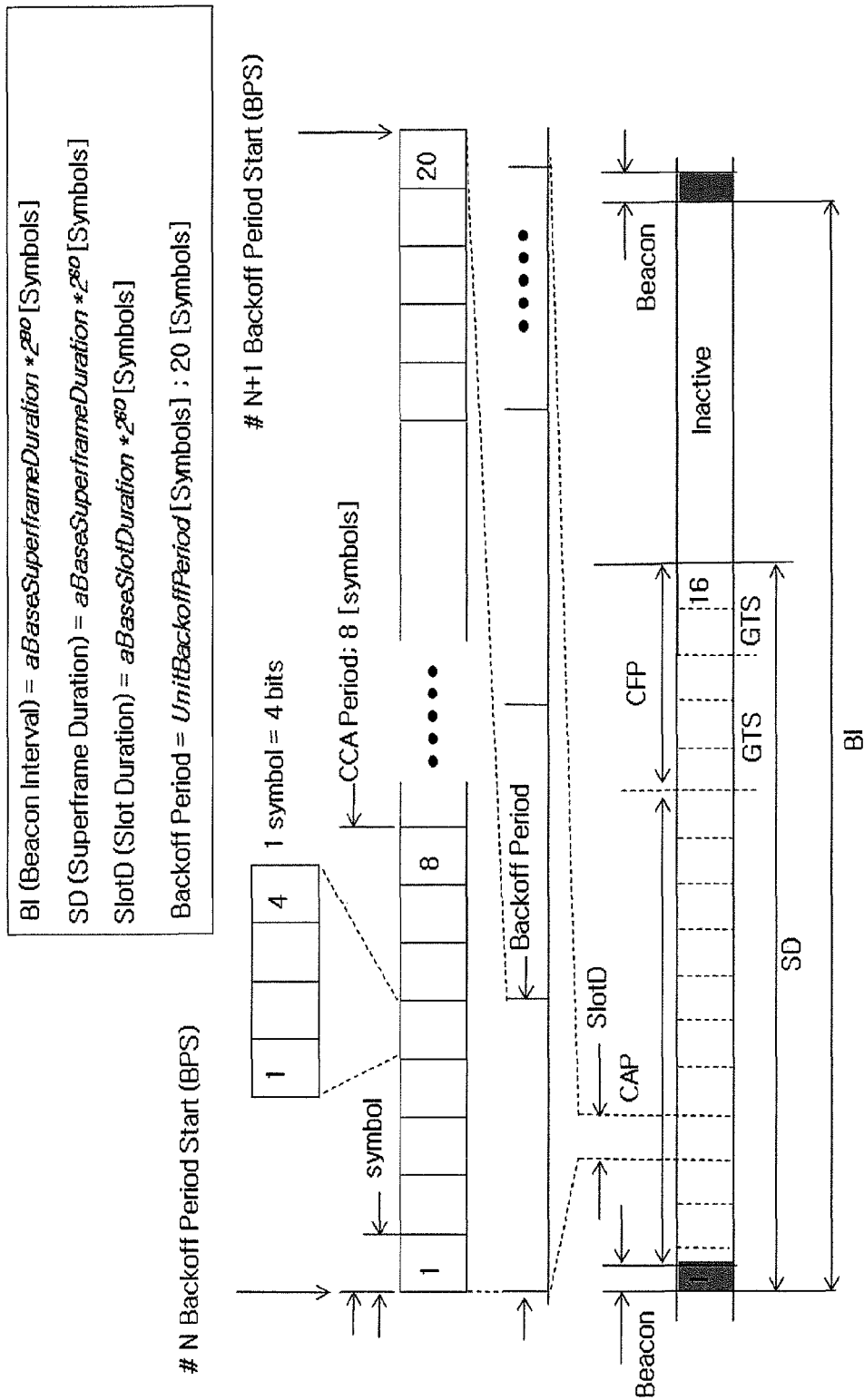
FIG. 1 illustrates a superframe structure in a slotted IEEE 802.15.4 sensor network equipped with collision avoidance mechanism according to an exemplary embodiment of the present invention.

FIG. 1 illustrates a superframe structure in a slotted IEEE 802.15.4 sensor network equipped with a collision avoidance mechanism according to an exemplary embodiment of the present invention. Exemplary embodiments of the present invention will be described using 2.4 GHz (i.e., sixteen channels each having 5 MHz) in the accompanying drawings.

For IEEE 802.15.4 CSMA/CA algorithm, all frames in a superframe structure using beacons use a slotted CSMA/CA algorithm to transmit data. If the beacons are not used, data transmission is performed using unslotted CSMA/CA algorithm. In either case, a backoff algorithm is performed using a backoff period which is a waiting period for data transmission/reception. The backoff period is defined in twenty (20) symbols. The symbol is the unit of RF data. One byte of data consists of two symbols and one symbol has sixteen (16) us; therefore, one byte has thirty-two (32) us.

For an IEEE 802.15.4 beacon mode, a BI (beacon interval) is divided into an active part (i.e., SD (superframe duration)) and an inactive part. This interval is adjusted by a coordinator transmitting BO (beacon order) and SO (superframe order) to neighboring nodes. Beacons provide synchronization to neighboring nodes.

The SD consists of sixteen (16) time slots, which can be further divided into the following three parts: beacon, CAP (contention access period) and CFP (contention free period). A GTS (Guaranteed Time Slot) technique is employed to implement the CFP. One of the sixteen time slots of the SD is referred to as SlotD (slot duration) which consists of several backoff periods each consisting of several symbols. For IEEE 802.15.4 2.4 GHz hardware, one backoff period has twenty (20) symbols each being made up of four bits. The start of the backoff period is referred to as BPS (Backoff Period Start). For a beacon mode, both transmission and CCA (clear channel assessment) are performed at the BPS. For the IEEE 802.15.4 standard, when 10 dB or more or eight symbols or more are detected, CCA recognizes that a channel is busy.

For the IEEE 802.15.4 standard, it is generally determined through the CCA whether or not a communication channel is in an idle state. In this case, for the IEEE 802.15.4 slotted CSMA/CA, a coordinator of a sensor network sends beacon frames to its neighboring nodes to provide slot synchronization. Slot synchronization and data transmission will be described in detail.

The first scenario is when a coordinator transmits data to a sensor node. In this case, the coordinator sends the sensor node a beacon frame with information that there is data to transmit. The sensor node monitors at regular intervals whether or not beacon information is received. If the sensor node receives the beacon information, the sensor node performs time slot synchronization and requests data using a MAC command frame. In response to this request, the coordinator transmits the data to the sensor node. After receiving the data, the sensor node transmits an ACK (Acknowledgment) frame to the coordinator.

The second scenario is when a sensor node transmits data to a coordinator. In this case, the sensor node awaits a beacon to receive. If the sensor node recognizes the beacon, synchronization of a superframe structure is performed. The sensor node transmits data to the coordinator using the slotted CSMA-CA. The coordinator may optionally an ACK frame to the sensor node.

Figure 2:
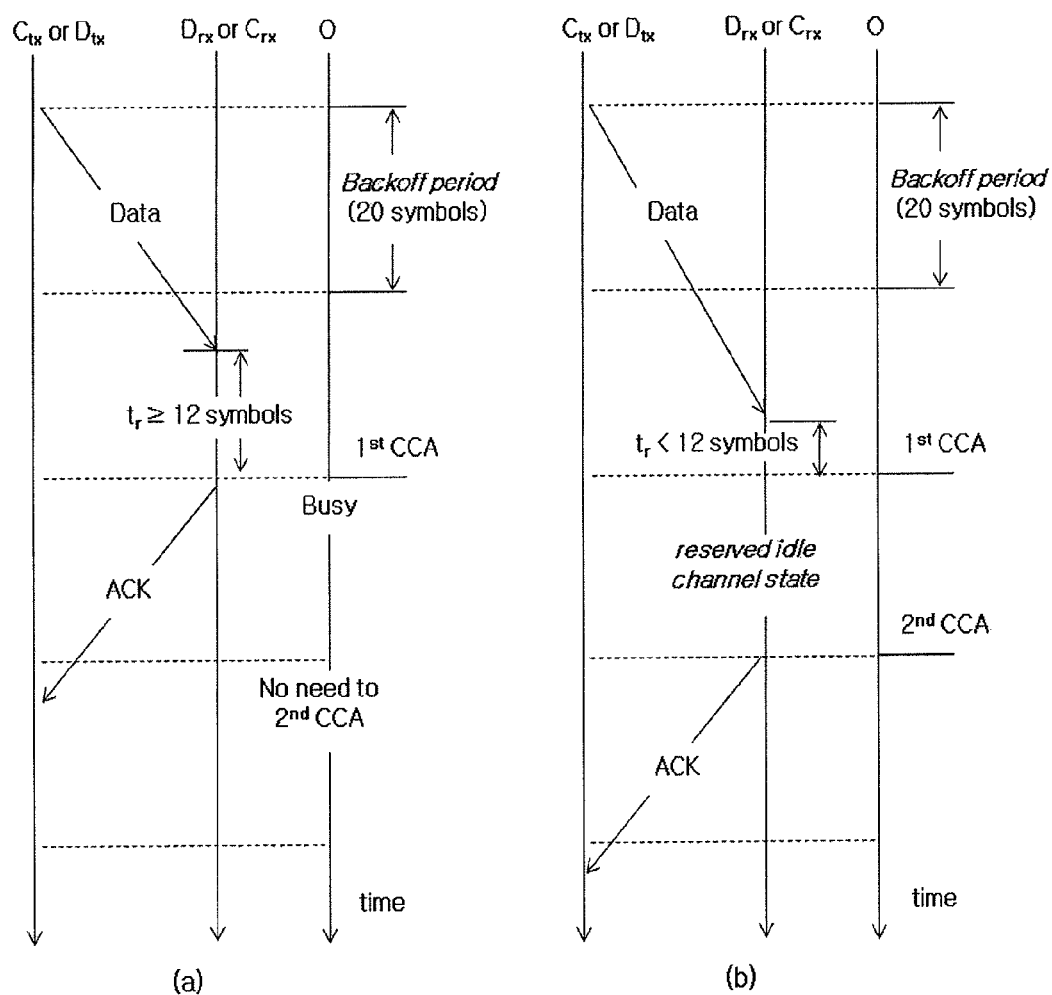
FIG. 2 is a diagram illustrating problems occurring when a remaining time between data transmission and a backoff period is less than a turnaround time in a sensor network according to an exemplary embodiment of the present invention.
Figure 3:
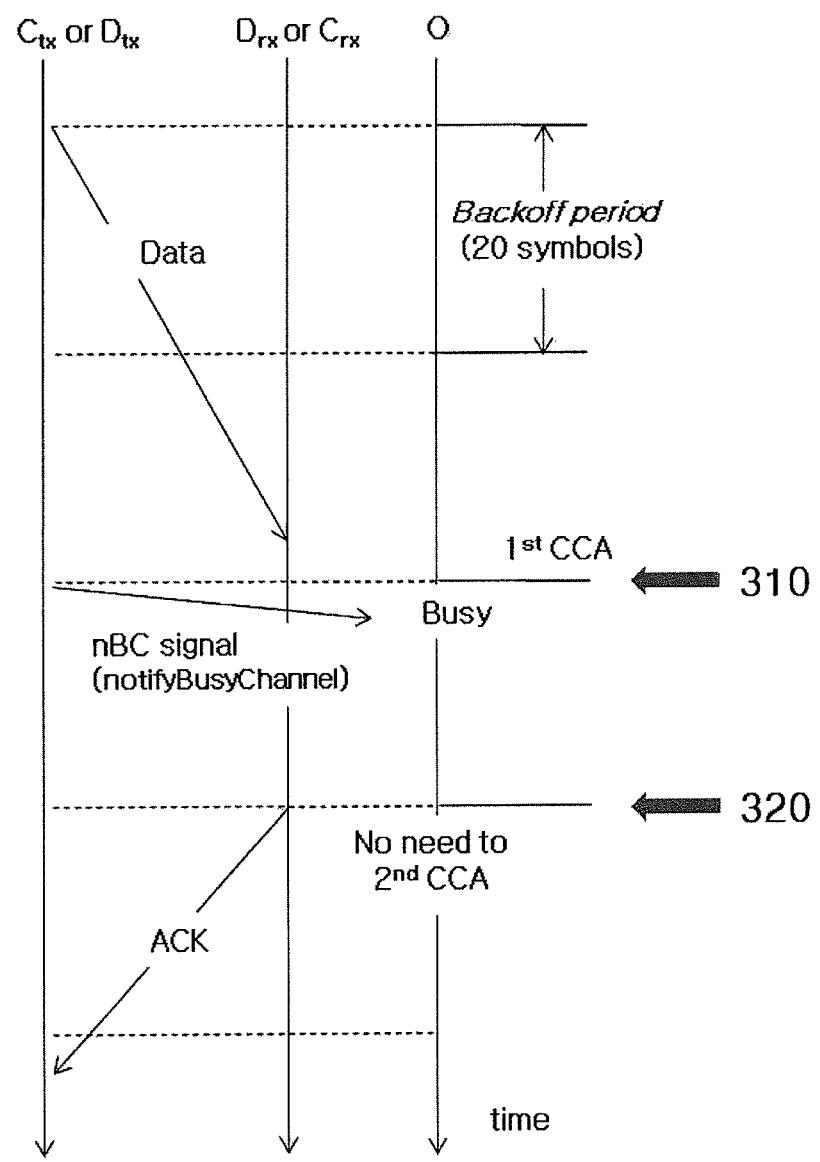
FIG. 3 is a diagram illustrating a process performed when a remaining time between data transmission and a backoff period is less than a turnaround time according to a method for collision avoidance in a sensor network according to an exemplary embodiment of the present invention.

Two scenarios where a remaining time between data transmission and a backoff period is less than a turnaround time will be described with reference to FIG. 2. FIG. 2 is a diagram illustrating problems occurring when a remaining time between data transmission and a backoff period is less than a turnaround time in a sensor network according to an exemplary embodiment of the present invention. In FIGS. 2 and 3, Ctx (data transmission coordinator) indicates a coordinator upon data transmission, Crx (data reception coordinator) indicates a coordinator upon data reception, Dtx (data transmission device) indicates a sensor node upon data transmission, Drx (data reception device) indicates a sensor node upon data reception, and O (Other device) indicates a third node (i.e., a node unrelated to ongoing data transmission/reception) other than a transmitter or a receiver. A time difference between data transmission and the start of the following backoff period (BPS) is denoted by $t_r$. In FIGS. 2 and 3, a vertical axis indicates the elapse of time, a time axis is divided by the backoff period, and time slots of elements, such as coordinator, sensor node and third node, are synchronized with one another.

In FIG. 2, each transmitter transmits data to each receiver and receives an ACK frame in response. It is assumed that a third node performs CCA to check if a communication channel is in an idle state to allow the third node to use the communication channel.

If IEEE 802.15.4 beacon-enabled mode and ACK option are set beforehand, the third node performs CCA once or twice according to a CSMA-CA algorithm. The ACK option is used to indicate whether or not to use an acknowledgement (ACK) signal. The IEEE 802.15.4 standard uses frequency bandwidths of 868 MHz, 915 MHz and 2.4 GHz for operation. The IEEE 802.15.4 slotted CSMA-CA in beacon-enabled mode performs the start of transmission of all kinds of frames and the start of CCA for the backoff period. Since the data to transmit varies in size, a difference between a start point of a backoff period to transmit data and another start point of a next backoff period is similarly variable. This variable time difference is related to a period of time taken for hardware, such as an RF module, to switch from a transmit (Tx) mode to a receive (Rx) mode. The period of time taken for the RF module to switch a mode is referred to as a turnaround time (TAT), which is defined in twelve (12) symbols in the IEEE 802.15.4 standard.

It is assumed that a node transmitting data is referred to as a transmitter and a node receiving the data is referred to as a receiver. If a remaining time between the time when the transmitter transmits data in a current backoff period and the next backoff period is less than twelve symbols, the transmitter cannot receive an ACK signal although the receiver sends the ACK signal in the next backoff period since switching of the transmitter from Tx mode to Rx mode needs at least the turnaround time (i.e., a period of time taken for twelve symbols) due to constrains on the transmitter hardware.

Based on the above, the following equation 1 is established for the IEEE 802.15.4 standard:

$$a\ \text{TurnaroundTime} \leq t_{ack} \leq a\ \text{TurnaroundTime} + a\ \text{UnitBackoffPeriod} \quad (1)$$

In the equation 1, the term indicates a period of time between data transmission and ACK reception, "a TurnaroundTime" indicates a turnaround time (e.g., a period of time taken for twelve symbols), and "a UnitBackoffPeriod" indicates a backoff unit (e.g., a period of time taken for twenty symbols). Accordingly, for the IEEE 802.15.4 standard, the equation 1 may be expressed in the following equation 2:

$$12 \leq t_{ack} \leq 32 \quad (2)$$

Turning to the equation 1, if a remaining time between data transmission of the transmitter and a first backoff period is equal to or greater than the turnaround time, the transmitter may receive an ACK signal in a second backoff period. Accordingly, if a third node performs a first CCA in the second backoff period, the third node may recognize that a channel is busy. As a result, the third node does not need to repeat CCA in a third backoff period.

FIG. 2A illustrates remaining time $t_r$ between data transmission and the following backoff period (i.e., BPS (the start of the following backoff period)), which is equal to or greater than twelve symbols. In this case, after sending data, a transmitter cannot receive an ACK signal due to hardware constraints before the elapse of a period of time taken to switch from Tx mode to Rx mode. Accordingly, a remaining time $t_r$ of twelve symbols or more means that the transmitter can receive an ACK signal at the immediately following BPS. In the BPS, CCA as well as data transmission and ACK signal transmission is performed. Accordingly, if a third node performs a first CCA in the following BPS, the third node recognizes that a channel is busy due to the ACK signal, resulting in no additional CCA being performed.

On the other hand, if the remaining time between data transmission of the transmitter and the following first backoff period is less than the turnaround time, the transmitter cannot receive an ACK signal in the following second backoff period due to hardware constraints. As a result, a channel is not in use for the second backoff period and the transmitter can receive an ACK signal in the following third backoff period. In this case, a third node needs to check whether or not a channel is in idle state in the second backoff period to transmit data in the second backoff period. That is, if the third node performs first CCA in the second backoff period, the third node may recognize that the channel is in idle state for the second backoff period. However, if the third node repeats CCA in the third backoff period according to the IEEE 802.15.4 standard, the third node recognizes that the channel is busy due to the ACK signal transmitted from the receiver to the transmitter, as described above.

FIG. 2B illustrates remaining time $t_r$ between data transmission and the following backoff period (i.e., BPS (the start of the following backoff period)), which is less than twelve symbols. In this case, after sending data, a transmitter cannot receive an ACK signal in the following BPS due to hardware constraints since a period of time for the transmitter to switch from Tx mode to Rx mode is not sufficient. In this case, the transmitter can receive an ACK signal in the next BPS. Accordingly, if third nodes perform a first CCA in the BPS where the ACK signal is not transmitted, the third nodes recognize that a channel is in idle state. However, if the third nodes perform a second CCA in the next BPS where the ACK signal is transmitted, the third nodes can recognize that the channel is busy due to the ACK signal. That is, this results in the unnecessary second CCA being performed to prevent collision.

For the IEEE 802.15.4 standard, the estimated energy consumption of a node is as follows, depending on the states of RF module:

TABLE 1

| State | Energy (mW) |
| --- | --- |
| Sleep Power (ESleep) | 0.06 |
| CCA Power (ECCA) | 51 |
| Transmit Power (ETx) | 59.1 |
| Receive Power (ERx) | 52.2 |
| Idle Power (EI) | 2.7 |

It can be seen from the table 1 that the energy consumption during performance of the CCA should be reduced in a sensor network with energy constraints. The present embodiments are directed to increasing available energy for the sensor network by not performing unnecessary CCA. The sensor network according to the present embodiments is configured to save energy by not allowing a third node to perform a second CCA if it seems apparent that a channel is in idle state in a first CCA phase but is expected to be used in the next backoff period. This will be described in detail with reference to FIG. 3.

FIG. 3 is a diagram illustrating a process performed when a remaining time between data transmission and a backoff period is less than a turnaround time according to a method for collision avoidance in a sensor network according to an exemplary embodiment of the present invention. In FIG. 3, it is assumed that a remaining time $t_r$ between data transmission of a transmitter and a backoff period is less than a turnaround time consisting of twelve symbols.

As described with reference to FIG. 2, to prevent a third node from performing an unnecessary second CCA, the transmitter sends the third node an extra signal informing that a channel corresponding to BPS 310 immediately following data transmission of the transmitter is expected to be used in the next BPS 320. The extra signal is referred to as nBC (notifyBusyChannel). The nBC signal may have, without limitation, an eight-symbol of zeros (0's).

Since the transmitter notifies the third node that a channel is busy due to the nBC in the BPS 310 immediately following data transmission of the transmitter, the third node may know that if the third node performs a first CCA at the same time as the BPS 310, an ACK signal will use the channel in the next backoff period 320. As a result, the third node does not perform an unnecessary second CCA in the next BPS 320. Further, since both a receiver receiving data and existing IEEE 802.15.4 nodes distributed in the sensor network are not changed in data format, they may analyze received data according to conventional standards.

The present embodiments will be described in detail with reference to the accompanying drawings. In the drawings, the same reference numbers denote the same elements. The present embodiments may be applied to any applications employing the IEEE 802.15.4 standard and may also be used to prevent channel congestion in any applications of wireless communication equipment utilizing CSMA-CA algorithm. Further, in the present embodiments, the transmitter is independent of a coordinator or a sensor node.

Figure 4:
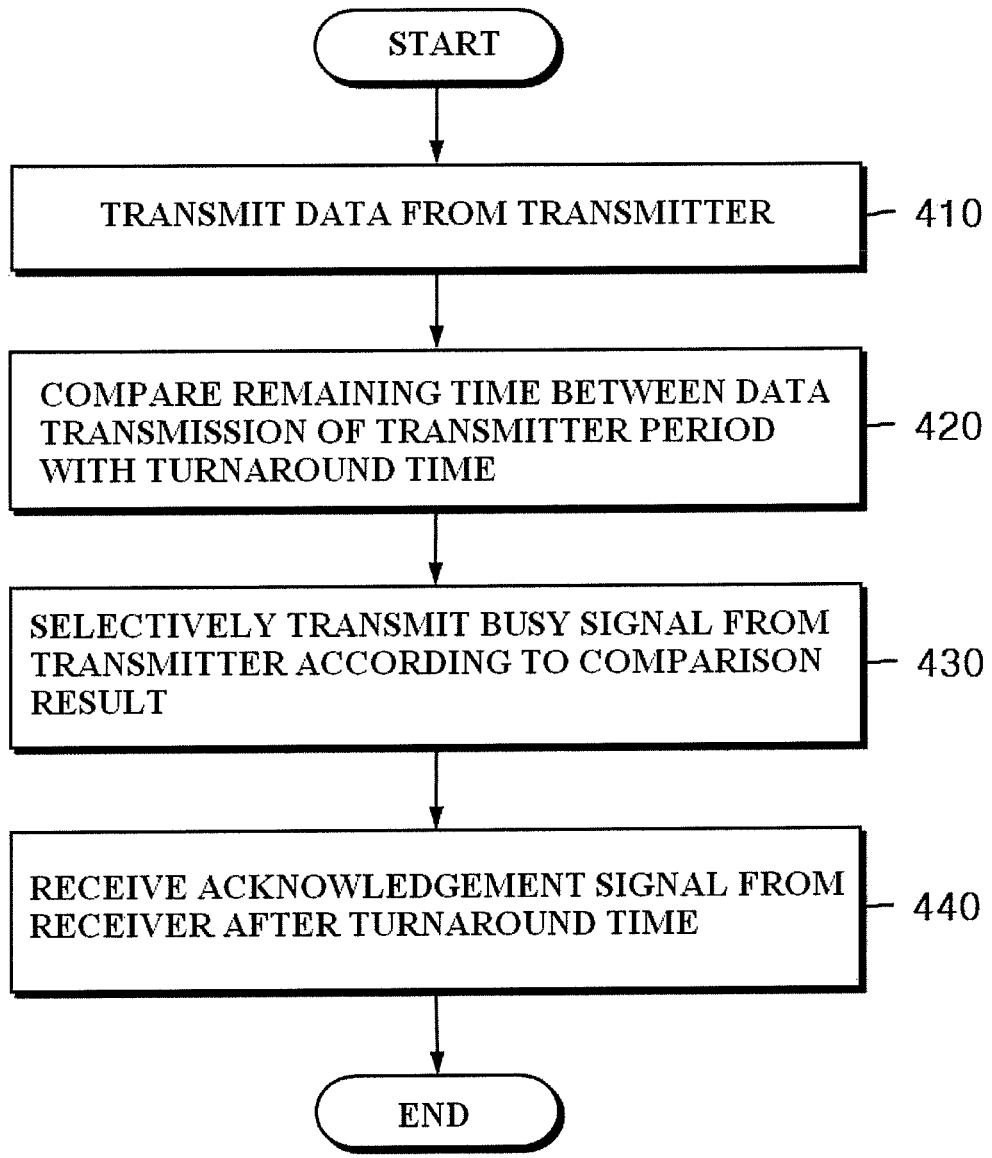
FIG. 4 is a flow chart illustrating a method for collision avoidance from a point of view of a transmitter in a sensor network according to an exemplary embodiment of the present invention.

FIG. 4 is a flow chart illustrating a method for collision avoidance, which is seen from a point of view of a transmitter, in a sensor network according to an exemplary embodiment of the present invention.

In operation 410, a transmitter transmits data to a receiver.

In operation 420, the transmitter compares a remaining time between data transmission in the operation 410 and a backoff period with a turnaround time taken for the transmitter to switch from a transmit (Tx) mode to a receive (Rx) mode.

In operation 430, the transmitter selectively sends a busy signal indicating that a channel is in use, according to the comparison result of the operation 420. The busy signal is an nBC signal, which is described above. A third node receives the busy signal and uses the busy signal to check whether or not the channel is busy. The selective transmission process will be described in detail with reference to FIG. 5.

Figure 5:
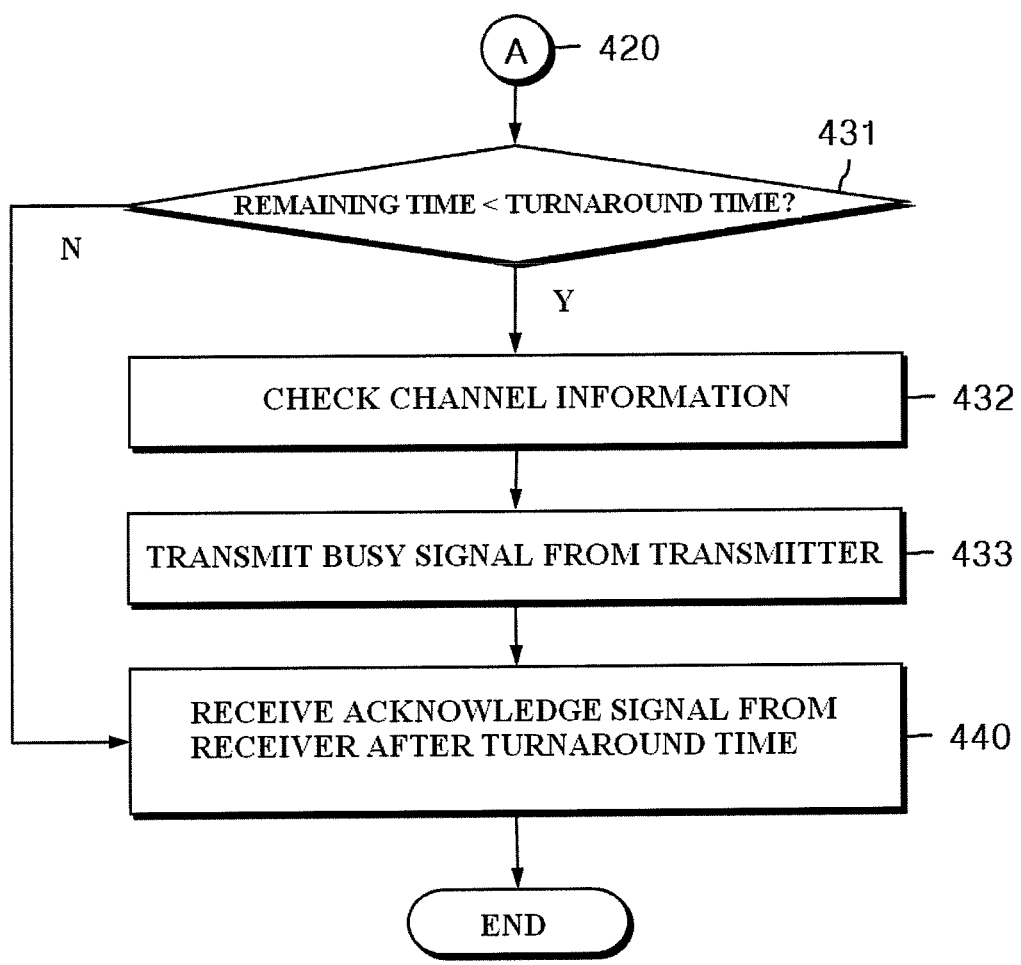
FIG. 5 is a flow chart illustrating a process for a transmitter to selectively transmit a busy signal in the method for collision avoidance in FIG. 4.

FIG. 5 is a flow chart illustrating a process for the transmitter to selectively transmit the busy signal in the method for collision avoidance in FIG. 4. A process following the operation 320 where the remaining time $t_r$ and the turnaround time are compared to each other will be described in detail.

In operation 431, it is determined whether or not the remaining time is less than the turnaround time. If the remaining time is less than the turnaround time, the process proceeds to operation 432. If not, the process proceeds to operation 440.

In operation 432, the transmitter checks its channel information using a failure counter indicating the frequency of CCA (clear channel assessment) failure and a congestion control counter indicating if a channel is busy. Such channel information checking has to be performed by the transmitter prior to transmission of an nBC signal. This channel information checking will be described in detail with reference to FIG. 7.

If a congestion control flag is set in the operation 432, the transmitter transmits a busy signal (nBC) in operation 433. The nBC signal is signal data consisting of one to eight symbols of zeros (0's). The nBC signal may vary in size depending on performance of hardware performing CCA.

In operation 440, if the remaining time is equal to or greater than the turnaround time, the transmitter waits for the turnaround time and receives an acknowledgement (ACK) signal from the receiver. In this case, data transmission is completed. Since the operation 433 where the transmitter sends the nBC signal is followed by the operation 440, the transmitter may receive the ACK signal from the receiver after the turnaround time has elapsed.

Accordingly, the sensor network checks in advance if a channel is busy and sends an nBC signal, thereby preventing unnecessary second CCA from being performed. Unless congestion occurs, a channel is used with a typical CSMA-CA technique.

The present embodiment may further include the transmitter checking in advance a beacon-enabled mode and an ACK option since the second CCA is not performed if a beacon is not enabled or an ACK signal is not used. Accordingly, the transmitter compares the remaining time with the turnaround time only if both the beacon-enabled mode and the ACK option are set.

Figure 6:
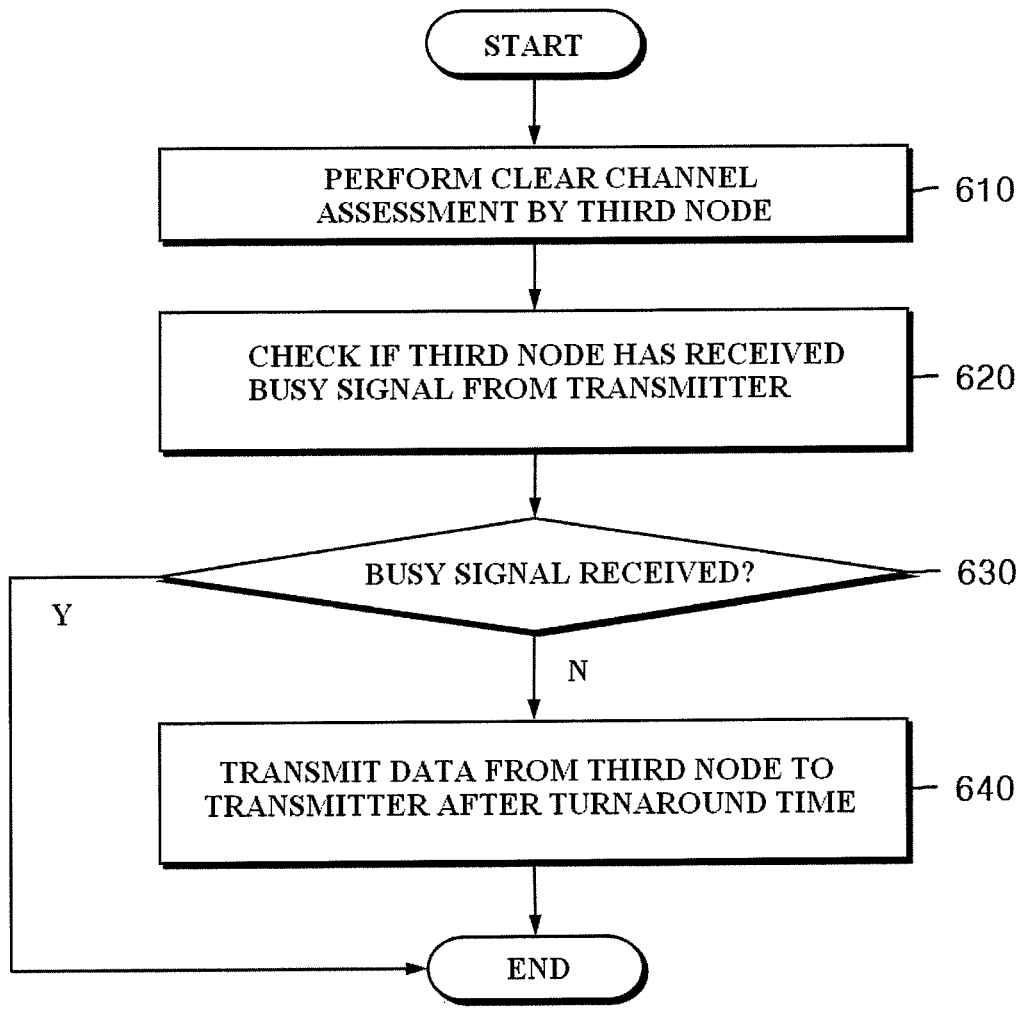
FIG. 6 illustrates a method for collision avoidance from a point of view of a third node rather than a transmitter or a receiver in a sensor network according to an exemplary embodiment of the present invention.

FIG. 6 illustrates a method for collision avoidance, which is seen from a point of view of a third node rather than a transmitter or a receiver, in a sensor network according to an exemplary embodiment of the present invention. This method includes operations corresponding to the operations performed in FIG. 4.

In operation 610, a third node instead of a transmitter or a receiver performs CCA.

In operation 620, the third node checks whether or not the third node has received a busy signal from the transmitter according to the CCA in the operation 610. The busy signal is a signal that is generated when the transmitter compares a remaining time between data transmission of the transmitter and a backoff period with a turnaround time taken for the transmitter to switch from a transmit mode to a receive mode and the remaining time is less than the turnaround time, and is transmitted from the transmitter.

In operation 630, it is determined whether or not the busy signal has been received. If the is busy signal has been received, the third node performs no operation since a target channel is in use or is expected to be used. Unless the busy signal has been received, the process proceeds to operation 640 where the third node sends data to the transmitter after the turnaround time has elapsed. That is, since the latter case means that the target channel is in idle state, the third node may use the channel.

Figure 7:
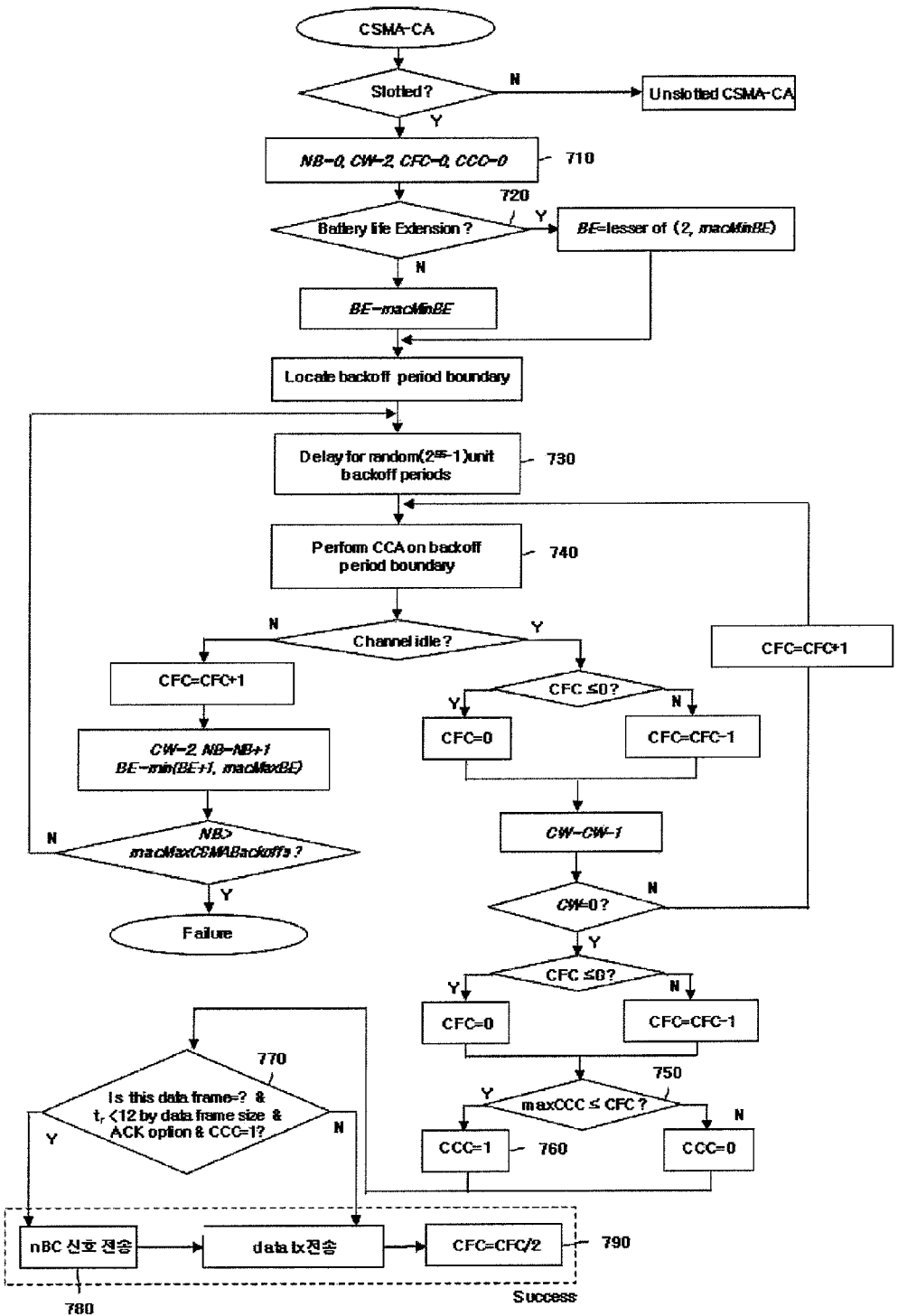
FIG. 7 is a flow chart illustrating a process of checking channel information using a to failure counter and a congestion control counter in a method for collision avoidance in a sensor network according to an exemplary embodiment of the present invention.

FIG. 7 is a flow chart illustrating a process of checking channel information using a failure counter and a congestion control counter in a method for collision avoidance in a sensor network according to an exemplary embodiment of the present invention. A detailed description will be mainly made on features which are distinguishable over a typical CSMA/CA flowchart. In FIG. 7, variables for use in channel access control are as follows: NB (Number of Backoff) indicates the frequency of backoff attempts during one frame transmission; BE (Backoff Exponent) indicates a backoff exponent to generate a random backoff period prior to transmission attempt; CW (Contention windows length) indicates the counter for CCA after the random backoff period. That is, this indicates the number of slots to determine whether or not a channel is available prior to the start of frame transmission. In FIG. 7, CFC (CCA Failure Counter) and CCC (Channel Congestion Control) flags are newly added in the present embodiment. CFC is a counter to record the frequency of CCA failure when a node performs CCA, and CCC is used to determine whether or not channel congestion control is needed. maxCCC is a constant which is set to be greater than zero (0) by an operator.

If CFC is greater than maxCCC, the nBC signal is transmitted. Description of unslotted CSMA/CA is omitted to enhance clarity and conciseness.

For the slotted CSMA/CA, a MAC sub-layer initializes NB, CW, CFC and CCC values in operation 710 and determines whether or not battery life extension is needed in operation 720. Then, the start of a backoff period is located. In operation 730, it is delayed as many as the number of random slots of the backoff period which is determined from a range from 0 to $2^{BE}-1$.

In operation 740, the MAC sub-layer requests CCA from a physical layer. If it is determined from the CCA result whether or not a channel is in idle state, it is determined using the CFC and the CCC whether or not the channel is busy. In the present embodiment, in operations following CCA, CFC is increased when CCA failure occurs (i.e., when the channel is busy), while CFC is decreased when CCA is successful (i.e., when the channel is in idle state). In this case, CFC will not have negative values. If CFC has negative values, the congestion control does not have to be performed since the sensor network is in good condition. If CCA failure continues to occur, CFC may be increased to infinity. In this case, if CFC is increased above a predetermined range, CFC may be initialized back to zero (0).

In operation 750, CFC is compared with maxCCC which is preset by the operator. If CFC is greater than the maxCCC, the process proceeds to operation 760 where CCC flag is set.

In operation 770, if a frame to transmit is a data frame, the remaining time $t_r$ for the data frame is less than twelve symbols, ACK option is set, and CCC is equal to 1, the process proceeds to operation 780 where the nBC signal is transmitted. If not, the operation 780 is omitted and the data frame is transmitted according to a typical IEEE 802.15.4 standard. If the data transmission is completed, the process proceeds to operation 790 where CFC is reduced to a half (CFC/2).

In the algorithm described above, CCA failure rate corresponds to channel congestion rate. In the present embodiment, CFC used to calculate the congestion rate in the sensor network is increased one by one and is reduced to a half after the data transmission, thereby preventing a waste of energy due to unnecessary transmission of nBC signals. In summary, CFC is increased by one if a channel is determined to be busy from the CCA result, and CFC is reduced to a half if the transmitter successfully transmits data.

Figure 8:
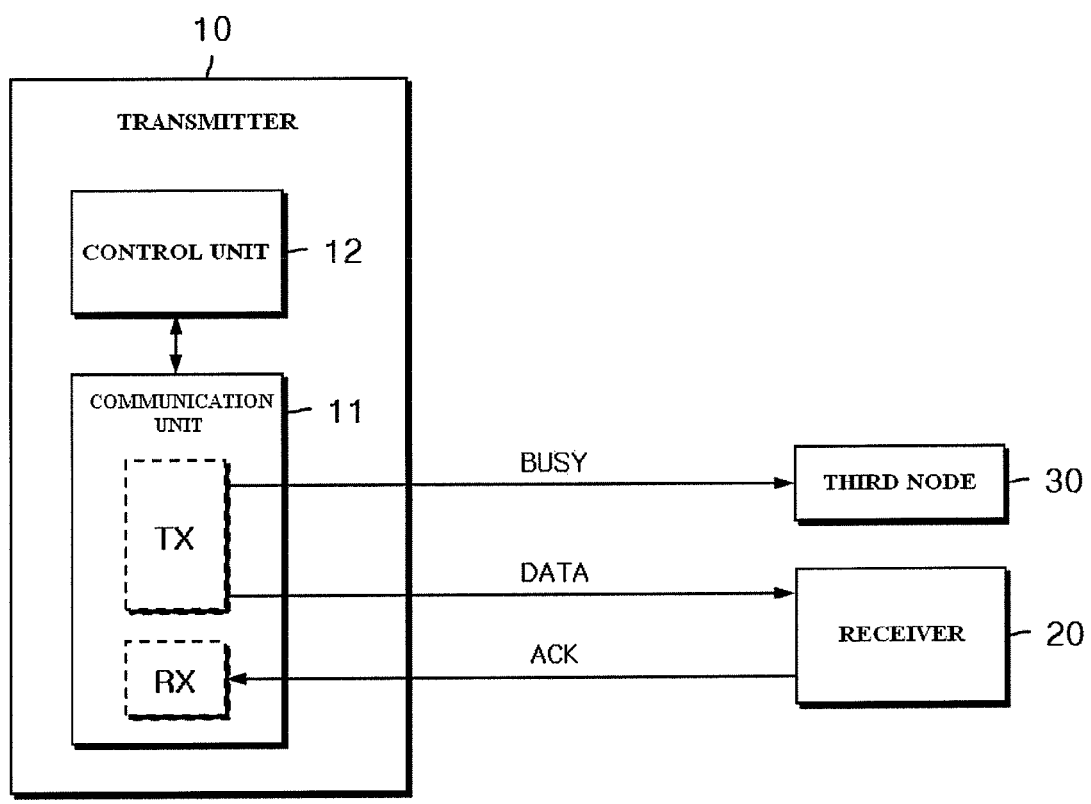
FIG. 8 is a block diagram illustrating an apparatus for collision avoidance in a sensor network according to an exemplary embodiment of the present invention.

FIG. 8 is a block diagram illustrating an apparatus for collision avoidance in a sensor network according to an exemplary embodiment of the present invention. The apparatus includes a transmitter 10, a receiver 20 and a third node 30. The transmitter 10 includes a communication unit 11 and a control unit 12. In particular, FIG. 8 illustrates data transmission between the transmitter 10, the receiver 20 and the third node 30.

The communication unit 11 transmits and receives data in transmit (Tx) mode and receive (Rx) mode, respectively. The communication unit 11 transmits data to the receiver 20 and receives an ACK signal from the receiver 20. The communication unit 11 transmits a busy signal to the third node 30. It will be apparent to those skilled in the art that the communication unit 11 may be implemented by an RF module such as CC2420. Description of the physical structure of the communication unit 11 is omitted to enhance clarity and conciseness.

The control unit 12 compares a remaining time between data transmission in Tx mode and a backoff period with a turnaround time taken to switch from Tx mode to Rx mode, and waits for the remaining time using a delay function.

The communication unit 11 selectively transmits a busy signal, which indicates a channel is busy, to the third node 30 in Tx mode according to the comparison result of the control unit 12, and is switched to Rx mode after the elapse of the turnaround time to receive an ACK signal from the receiver 20. The communication unit 11 checks channel information using a failure counter (i.e., CFC) indicating the frequency of CCA failure and a congestion control counter indicating if a channel is busy. If the remaining time is less than the turnaround time and the congestion control counter is enabled, the communication unit 11 transmits a busy signal.

The control unit 12 checks beacon-enabled mode and ACK option beforehand. If both the beacon-enabled mode and the ACK option are set, the control unit 12 may compare the remaining time and the turnaround time and determine whether or not to transmit the busy signal.

It will be apparent to those skilled in the art that the control unit 12 may be implemented by an MCU (micro controller unit) such as Atmega 128L.

Figure 9:
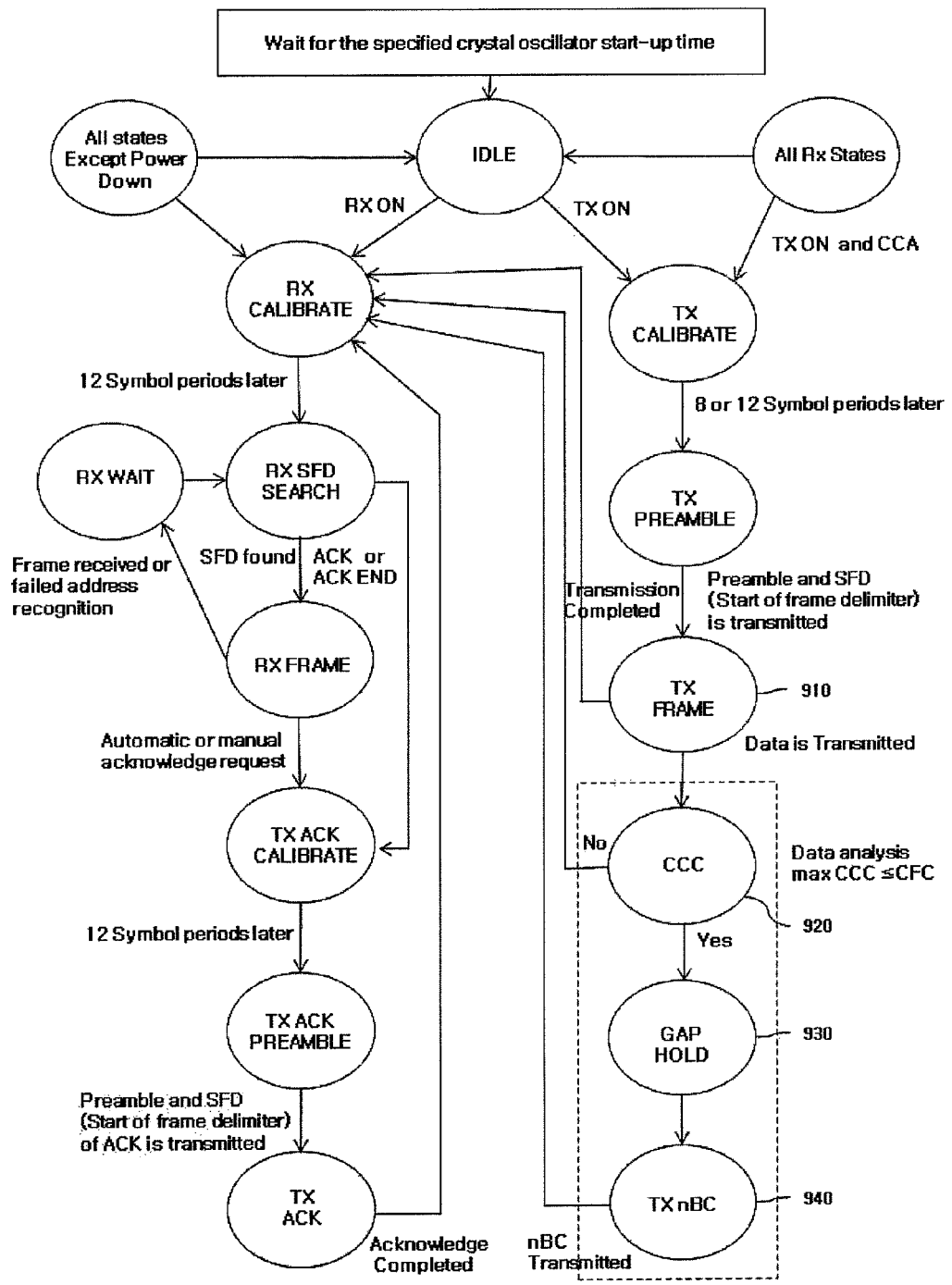
FIG. 9 is a flow chart illustrating a process for performing operations in communication is mode from a point of view of a communication unit in the apparatus for collision avoidance in FIG. 8.

FIG. 9 is a flow chart illustrating a process for performing operations in communication mode from a point of view of a communication unit in the apparatus for collision avoidance in FIG. 8. In particular, FIG. 9 illustrates RF control of CC2420. Description of a method for collision avoidance using an nBC signal will be given with reference to FIG. 9.

As described above, since the sensor node to transmit data knows the size of the data, the sensor node can know whether or not the remaining time $t_r$ is less than twelve symbols. The sensor node can also know whether or not the ACK option is preset. Accordingly, in operation 920, CCC determines whether or not to transmit the nBC signal according to results obtained from congestion control.

If a CFC value is equal to or greater than maxCCC, the process proceeds to operation 930 where it is in GAP HOLD state. Since the GAP HOLD knows the size of data, a remaining time ($t_r$ symbols) until the next BPS is calculated, and it is delayed during a corresponding time using a delay function.

After the elapse of the delay time, the process proceeds to operation 940 where eight symbols of zeros (0's) are transmitted in Tx nBC state. That is, the RF module remains in Tx mode in TX FRAME state of the operation 910 and is not switched to Rx mode in GAP HOLD state. The RF module transmits the nBC signal in TX nBC state and is switched to Rx mode. Through such state change, TAT, which is a period of time for switching of the RF module from Tx mode to Rx mode, is satisfied. Accordingly, it can be seen from the flow chart of FIG. 9 that the present embodiments can be satisfactorily implemented based on hardware.

As apparent from the above description, by selectively transmitting the busy signal based on comparison results of the remaining time between the data transmission and the backoff period and the turnaround time in the sensor network according to the present embodiments of the invention, in a process of switching of communication hardware of sensor nodes from Tx mode to Rx mode, other sensor nodes can determine if the channel is busy without performing unnecessary CCA (clear channel assessment). Furthermore, it is possible to determine if the channel is busy in both directions of the coordinator and the sensor node using the same data format without modification of hardware. In addition, it is possible to save energy for use in operation of the sensor network and data transmission/reception by reducing the frequency of CCA. In particular, since data format needs not to be modified, the sensor nodes according to the present embodiments are compatible with other sensor nodes of existing sensor networks.

The present invention can be implemented as computer readable code in a computer readable recording medium. The computer readable recording medium includes all types of recording media in which computer readable data are stored.

Examples of the computer readable recording medium include a ROM, a RAM, a CD-ROM, a magnetic tape, a floppy disk, and an optical data storage. Further, the recording medium may be implemented in the form of a carrier wave such as Internet transmission. In addition, the computer readable recording medium may be distributed to computer systems over a network, in which computer readable code may be stored and executed in a distributed manner. The computer readable code and code segments for implementing the present invention may be easily inferred by computer programmers skilled in the art.

The present invention has been described with reference to the foregoing embodiments. It will be understood by those skilled in the art that the invention can be implemented in other specific forms without changing the spirit or essential features of the invention. Therefore, it should be noted that the embodiments are to be considered illustrative in all aspects and are not to be considered in a limiting sense. The scope of the invention is defined by the appended claims rather than the detailed description of the invention. All changes which come within the range of equivalency of the claims should be construed as falling within the scope of the invention.

What is claimed is:

1. A method for collision avoidance in a sensor network in compliance with a predetermined standard, the method comprising:
    transmitting data by a transmitter;
    comparing, by the transmitter, a remaining time between the data transmission and a backoff period with a turnaround time taken for the transmitter to switch from a transmit (Tx) mode to a receive (Rx) mode;
    selectively transmitting, by the transmitter, a busy signal indicating that a channel is in use, according to the comparison result; and
    receiving, by the transmitter, an acknowledgement (ACK) signal from a receiver after the turnaround time has elapsed,
    wherein the selectively transmitting of a busy signal comprises transmitting, by the transmitter, the busy signal if the remaining time is less than the turnaround time.

2. The method of claim 1, wherein the selectively transmitting of a busy signal further comprises checking, by the transmitter, channel information thereof using a failure counter indicating a frequency of clear channel assessment (CCA) failure and a congestion control counter indicating whether or not a channel is busy, and
    wherein if the remaining time is less than the turnaround time and the congestion control counter is enabled, the transmitter transmits the busy signal.

3. The method of claim 2, wherein the failure counter is increased by one if a channel is determined to be busy as a result of the CCA, and the failure counter is reduced to a half if the transmitter successfully transmits the data.

4. The method of claim 1, wherein the selectively transmitting of a busy signal comprises the transmitter waiting for the turnaround time if the remaining time is equal to or greater than the turnaround time.

5. The method of claim 1, further comprising checking, by the transmitter, a beacon-enabled mode and an ACK option beforehand,
    wherein the remaining time is compared with the turnaround time if the beacon-enabled mode and the ACK option are set.

6. The method of claim 1, wherein the transmitter is at least one of a coordinator and a sensor node.

7. The method of claim 1, wherein the predetermined standard is a slotted IEEE 802.15.4 standard.

8. A method for collision avoidance in a sensor network in compliance with a predetermined standard, the method comprising:
    performing clear channel assessment (CCA) by a node rather than a transmitter or a receiver;
    checking whether or not the node has received a busy signal from the transmitter; and
    selectively transmitting, by the node, data to the transmitter after the turnaround time has elapsed according to the CCA result and the checking result,
    wherein the busy signal is generated and transmitted by the transmitter if a remaining time between data transmission of the transmitter and a backoff period is compared with a turnaround time taken to switch from a transmit (Tx) mode to a receive (Rx) mode and the remaining time is less than the turnaround time.

9. The method of claim 8, wherein the selectively transmitting of data comprises transmitting data from the node to the transmitter only if the channel is in idle state and the busy signal is not received.

10. The method of claim 8, wherein the predetermined standard is a slotted IEEE 802.15.4 standard.

11. A non-transitory computer-readable recording medium having embodied therein instructions, which, when executed in a computer system, cause the computer system to perform the method of claim 1.

12. A non-transitory computer-readable recording medium having embodied therein instructions, which, when executed in a computer system, cause the computer system to perform the method of claim 8.

13. An apparatus for collision avoidance in a sensor network in compliance with a predetermined standard, the apparatus comprising:
    a communication unit configured to transmit and receive data in transmit (Tx) mode and receive (Rx) mode, respectively; and
    a control unit configured to compare a remaining time between the data transmission in the transmit mode and a backoff period with a turnaround time taken to switch from the transmit mode to the receive mode, and configured to wait for the remaining time using a delay function,
    wherein the communication unit selectively transmits in the transmit mode a busy signal indicating that a channel is in use according to the comparison result of the control unit, and is switched to the receive mode after the turnaround time has elapsed to receive an acknowledgement signal from a receiver receiving the data,
    wherein the communication unit transmits the busy signal if the remaining time is less than the turnaround time.

14. The apparatus of claim 13, wherein the communication unit checks channel information thereof using a failure counter indicating a frequency of clear channel assessment (CCA) failure and a congestion control counter indicating whether or not a channel is busy, and
    the communication unit transmits the busy signal if the remaining time is less than the turnaround time and the congestion control counter is enabled.

15. The apparatus of claim 13, wherein the control unit checks a beacon-enabled mode and an ACK option beforehand, and
    wherein if the beacon-enabled mode and the ACK option are set, the control unit compares the remaining time with the turnaround time to determine whether or not to transmit the busy signal.

16. The apparatus of claim 13, wherein the predetermined standard is a slotted IEEE 802.15.4 standard.

* * * * *